US012293429B1

(12) United States Patent
Shiu et al.

(10) Patent No.: US 12,293,429 B1
(45) Date of Patent: May 6, 2025

(54) FLEET ROUTING CONTROL SYSTEM AND METHOD

(71) Applicant: Zum Services, Inc., Redwood City, CA (US)

(72) Inventors: Melissa Shiu, San Francisco, CA (US); Constantine Gerasimovich, San Francisco, CA (US); Lipi Sanghi, Sunnyvale, CA (US); Andrew Mormysh, Redwood City, CA (US); Abhishek Garg, Los Altos, CA (US); Rohit Jain, Sunnyvale, CA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 18/744,436

(22) Filed: Jun. 14, 2024

(51) Int. Cl.
*G06Q 50/40* (2024.01)
*G08G 1/123* (2006.01)

(52) U.S. Cl.
CPC ............. *G06Q 50/40* (2024.01); *G08G 1/123* (2013.01)

(58) Field of Classification Search
CPC ...... G06Q 50/40; G06Q 10/08; G06Q 10/047; G06Q 10/083; G06Q 10/06311
See application file for complete search history.

(56) References Cited

U.S. PATENT DOCUMENTS

2015/0046363 A1* 2/2015 McNamara ........ G06Q 10/0833 705/333
2016/0364679 A1* 12/2016 Cao ...................... G06Q 10/083
2020/0286021 A1* 9/2020 Luckay ............ G06Q 10/08355
2022/0092530 A1* 3/2022 Newell .................. G06N 20/00
2023/0014602 A1* 1/2023 Narayan ................ G08G 1/205
2023/0185502 A1* 6/2023 Sheeran ............... G06Q 10/083 358/1.15

OTHER PUBLICATIONS

Kim, Y. J. (2003). Hybrid approaches to solve dynamic fleet management problems (Order No. 3116412). Available from ProQuest Dissertations and Theses Professional. (305293931). (Year: 2003).*
Zhong, H. (2001). Territory planning and vehicle dispatching with stochastic customers and demand (Order No. 3065871). Available from ProQuest Dissertations and Theses Professional. (276192231). (Year: 2001).*
Zhong, H., Hall, R. W., & Dessouky, M. (2007). Territory planning and vehicle dispatching with driver learning. Transportation Science, 41(1), 74-89. (Year: 2007).*
(Continued)

*Primary Examiner* — Maria C Santos-Diaz
(74) *Attorney, Agent, or Firm* — Kilpatrick Townsend & Stockton LLP

(57) ABSTRACT

A system and method include a server computer that determines a plurality of routes and corresponding route schedules for a plurality of ride service requests. The server computer assigns a plurality of vehicles to service each one of the plurality of routes and further assigns one of the plurality of vehicles to one of a plurality of drivers to perform the route according to the route schedule. The server computer may detect an exception to the route schedule, identify a resolution to the exception, and automatically implement the resolution to the exception.

17 Claims, 5 Drawing Sheets

500

(56) References Cited

OTHER PUBLICATIONS

Soares, R. F. F. (2022). New models and methods for the vehicle routing problem with multiple synchronisation constraints (Order No. 30835162). Available from ProQuest Dissertations and Theses Professional. (2925385440). (Year: 2022).*
Kasemsontitum, B. (2006). Vehicle routing with time windows and driver learning (Order No. 3237131). Available from ProQuest Dissertations and Theses Professional. (304968021). (Year: 2006).*
Moreira, J. (2008). Travel time prediction for the planning of mass transit companies: A machine learning approach (Order No. 29113761). Available from ProQuest Dissertations and Theses Professional. (2689288265). (Year: 2008).*

* cited by examiner

FLEET ROUTING CONTROL SYSTEM AND METHOD

TECHNICAL FIELD

The present application discloses systems and methods for monitoring and controlling a fleet of vehicles in a manner that supports scheduled ride service and routing. The disclosed systems and methods identify when a ride service is late or likely to be late and implement resolutions to correct the timing of the ride service.

BACKGROUND

The earliest advent of a fleet of vehicles likely dates back to antiquity when vehicles became necessary for the transport of people and goods. Fleets of boats are known to have existed in ancient Greece while fleets of chariots were known to have been used in ancient wars both as vehicles of war and as transport vehicles for soldiers and supplies. Even horses themselves have been used for the purpose of transporting people and goods. Indeed, many ancient stories of certain battles turn on the use of fleets of vehicles and their relative coordination in both timing and goals to the win or loss of a battle.

In the more recent past, trains, sail powered boats, and ocean liners were assembled into fleets for both military and civilian use. Since trips across continents or across oceans were typically of an extended duration, schedules and stops for these vehicles, especially in the context of civilian use, were published well in advance of an actual date of embarkation. These dates and schedules were largely accurate given the need to be at a next stop or location in a certain amount of time. Many ocean liners, for example, stopped in multiple ports to pick up passengers and goods before transporting both across the ocean. Trains kept a specific schedule on a time duration basis. For example, a train may leave from Paris for Berlin every other day allowing time for a day to make the trip from Paris to Berlin and a day to make the trip back. At the same time, other trains may have traveled from Trenton, New Jersey to New York City, New York several times per day. Historically, these schedules were based on the number of vehicles available and on the travel time necessary for trips between stops.

The advent of the modern automobile changed transportation all across the world on seemingly an overnight basis, at least in retrospect. Motorized land based transportation without the aid of rails made automobiles the transport method of choice for anything that was not too heavy or far away. Trucks could easily carry people and goods over short distances with very little notice, which was a major development for transportation. Buses became the vehicle of choice for transporting people as buses were fitted with seats for people. Trucks became the vehicle of choice for transporting goods from one place to another. As the relative prices of automobiles decreased and World Wars broke out, automobile fleets came into existence. Fleets of buses took passengers to places where rails did not exist while fleets of trucks took goods from boats in the harbor to soldiers fighting inland.

Fleet logistics became an issue of major importance to military and civilian fleet owners alike. It became imperative to ensure that certain vehicles were available for certain transportation tasks on a periodic basis, whether that basis was a multiple times per day basis, a day to day basis, a weekly basis, or some other periodic basis. Automobiles became different from fleet vehicles such as trains, boats, and other ocean going vessels because automobiles could schedule multiple trips per day while making repeated visits to a logistical hub or supply center. The pace at which trucks could supply goods outstripped anything that was previously known to human civilization and made the delivery of goods possible at scale. Buses developed scheduled times and routes for conveying passengers along certain routes at certain times.

Today, massive fleets of vehicles are owned by both governmental and private institutions to facilitate the transport of goods and passengers, which is a major logistics endeavor. Fleet vehicles may have routes which are traveled on a periodic basis to serve customers in various capacities. For example, mail is delivered to virtually every home in the United States on a daily basis by mail carriers in individual trucks. Other private mail or companies and goods delivery companies also have fleets of trucks to provide mail service for individual customers. Similarly, local governmental entities operate bus lines for mass transit of passengers, typically in and out of big cities. Public bus lines, for example, use main routes with spurs that serve residential areas of a city to facilitate passengers traveling into and out from the city on a daily basis. Both public and private schools operate bus lines to safely transport children to and from school on a daily basis. School buses, however, usually operate based on stopping at certain places at certain times to safely load children to attend local schools and, for that reason, travel routes that are based on where children live, generally speaking.

Logistics for these fleets are incredibly complex, which has been a persistent problem since antiquity. Horse cavalry attacking at the wrong time on an ancient Greek battlefield and buses arriving off schedule are different implementations of the same problem spread thousands of years apart. Maintenance, location, routing, fueling, and driver support are also considerations for fleet vehicles in order to deliver passengers or goods to a particular place by a particular time. In the context of school buses, a bus may be late because of a breakdown, construction delays, fuel problems, or a missing driver which may cause a child to be late for school. Further, school buses may serve redundant routes, which could be accommodated by a single bus, which increases the relative costs of providing bus services on virtually a daily basis.

Ensuring the timeliness of ride requests is one of the chief tasks necessary to provide a ride service so potential riders can meet a vehicle at a prescribed time. Minimal delays can have cascading impacts across an entire day of ride routing. Minimal delays may start with a vehicle not being ready or properly inspected, a driver being late, or getting caught in traffic inside the vehicle storage yard, for example. Conventional solutions to these problems have relied on drivers to proactively avoid being late, inspecting their vehicle, and exiting the vehicle storage yard early enough to avoid other drivers. Other less diligent drivers, for example, may cause the ride schedule to have cascading delays which delay route service all day long.

It is, therefore, one object of this disclosure to provide a routing system which optimizes routes for fleet vehicles. It is another object of this disclosure to provide control center in a routing system which monitors and controls driver specific scheduling. It is a further object of this disclosure to provide proactive methods and system to address cascading routing delays.

BRIEF SUMMARY

Various embodiments provide a system that includes a server computer comprising one or more processors and a memory storing instructions that, when executed by the one or more processors, cause the one or more processors to perform steps comprising: determining a plurality of routes and corresponding route schedules for a plurality of ride service requests, and assigning a plurality of vehicles to service each one of the plurality of routes. The steps further comprise: for each one of the plurality of routes, assigning a vehicle among the plurality of vehicles to a driver to perform a route according to a route schedule to which the vehicle is assigned, monitoring the plurality of vehicles, the plurality of routes and the corresponding route schedules, and detecting an exception to the route schedule. The steps further comprise: identifying a resolution to the exception based on an artificial intelligence analysis of historical data associated with one or more of the route schedule, the route, the vehicle, the driver, or the exception; and automatically implementing the resolution to the exception.

In various embodiments, the exception is based on one or more of the driver failing to clock-in at a scheduled time, the vehicle departing a vehicle storage facility after the scheduled time, the vehicle arriving at a first stop on the route for the vehicle, the vehicle being late to a scheduled stop, or not having the driver assigned to the vehicle.

In various embodiments, the instructions, when executed by the one or more processors, cause the one or more processors to perform steps further comprising: determining a score indicating an impact of the exception on a remainder of the route schedule. The resolution to the exception includes taking a corrective action associated with the route or the route schedule if the score is above a threshold, and the resolution to the exception includes sending a warning to a device scheduling or monitoring the route when the score is below the threshold.

In various embodiments, the score is determined based on an artificial intelligence analysis of the historical data associated with the exception.

In various embodiments, the instructions, when executed by the one or processors, cause the one or more processors to perform steps further comprising: displaying information associated with each one of the plurality of vehicles and the plurality of routes on a dispatch control center device; and identifying the exception on the dispatch control center device using one or more sensory cues.

In various embodiments, the dispatch control center device is configured to display historic data associated with a selected route, vehicle, or driver.

In various embodiments, the information associated with each one of the plurality of vehicles includes real-time aggregate data including information associated with one or more of a driver assigned to the vehicle, a time the vehicle started the route, a scheduled and actual stop time at one or more stops assigned to the route associated with the vehicle.

In various embodiments, the system further comprises a dispatch control center device.

In various embodiments, the resolution includes one or more of automatically sending a message to a device scheduling or monitoring the route, or automatically adjusting a remainder of the route schedule after the exception is detected.

In various embodiments, automatically implementing the resolution is based on a time threshold for performing a ride service request according to the route schedule.

Various embodiments provide a method comprising: determining, by a server computer, a plurality of routes and corresponding route schedules for a plurality of ride service requests; and assigning, by the server computer, a plurality of vehicles to service each one of the plurality of routes. The steps further comprise: for each one of the plurality of routes, assigning, by the server computer, a vehicle among the plurality of vehicles to a driver to perform a route according to a route schedule to which the vehicle is assigned; monitoring, by the server computer, the plurality of vehicles, the plurality of routes and the corresponding route schedules; and detecting, by the server computer, an exception to the route schedule. The steps further comprise: identifying, by the server computer, a resolution to the exception based on an artificial intelligence analysis of historical data associated with one or more of the route schedule, the route, the vehicle, the driver, or the exception; and automatically implementing, by the server computer, the resolution to the exception.

Various embodiments provide a non-transitory computer-readable medium storing instructions that, when executed on a server computer, cause the server computer to perform steps comprising: determining a plurality of routes and corresponding route schedules for a plurality of ride service requests; and assigning a plurality of vehicles to service each one of the plurality of routes. The steps further comprise: for each one of the plurality of routes, assigning a vehicle among the plurality of vehicles to a driver to perform a route according to a route schedule to which the vehicle is assigned; monitoring the plurality of vehicles, the plurality of routes and the corresponding route schedules; and detecting an exception to the route schedule. The steps further comprise: identifying a resolution to the exception based on an artificial intelligence analysis of historical data associated with one or more of the route schedule, the route, the vehicle, the driver, or the exception; and automatically implementing the resolution to the exception.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

The disclosure extends to vehicles of all types which are assembled into a fleet for a common purpose or goal such as, but not limited to, delivering passengers, delivering goods, or any other purpose.

In the following description of the disclosure, reference is made to the accompanying drawings, which form a part hereof, and in which are shown by way of illustration specific implementations in which the disclosure is may be practiced. It is understood that other implementations may be utilized, and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Various embodiments are described herein by using the illustrative use case of implementing a vehicle routing system to detect an exception to a route schedule assigned to a vehicle of a fleet, identify a resolution to the exception utilizing historical data, and implement the resolution to the exception. Although the vehicle routing system is discussed herein as providing exception detection and automatic implementation of resolutions for the exception in relation to buses, the embodiment of the present disclosure are not limited to use by buses and/or bus drivers nor are the embodiments limited to the transport of children. In particular, the vehicle routing system may be implemented by any suitable vehicle and/or fleet of vehicles. Moreover, the vehicle routing system may be implemented for the purpose of transporting passengers, goods, or any other suitable cargo. For example, the vehicle routing system may be employed by a fleet of delivery vehicles for transporting and delivering packages to customers.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
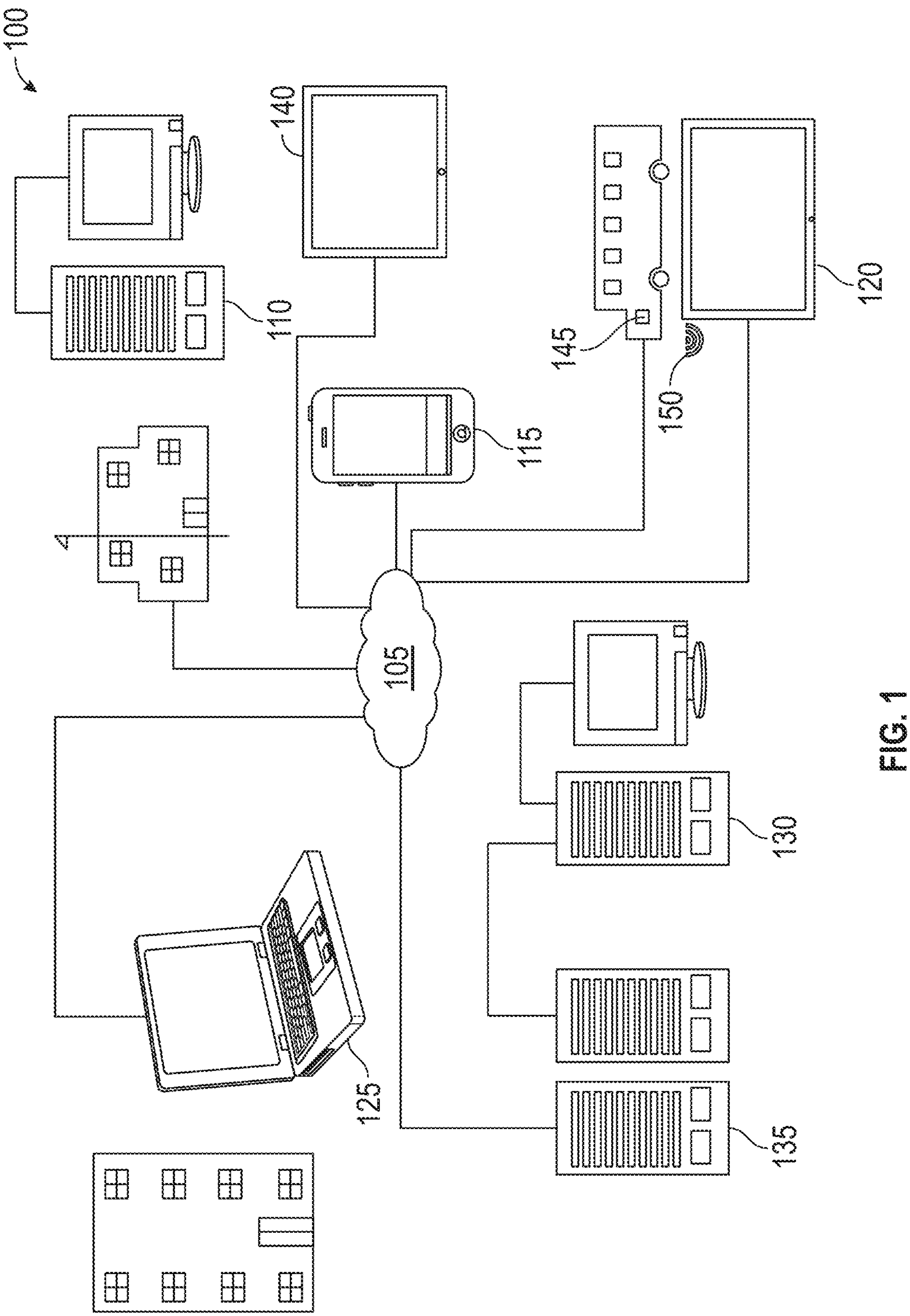
FIG. 1 illustrates a box diagram of a vehicle routing system, according to various embodiments.

FIG. 1 illustrates a box diagram of a vehicle routing system 100, according to various embodiments. As illustrated, the vehicle routing system 100 may include a communications network 105, a server computer 135, and various devices (e.g., a mobile phone, tablet device, computer, etc.) such as a ride requester device 110, a user device 115, a driver device 120, an administrator device 125, a provider device 130, dispatch control center device 140, vehicle device 145, etc. The vehicle routing system 100 may be used in conjunction with one or more vehicles of similar and/or varying types. For example, as described herein, one or more school buses in a fleet of school buses may implement the vehicle routing system 100.

Turning to the components of the vehicle routing system 100 in further detail. In some embodiments, a server computer 135 may be used to perform various operations of the vehicle routing system 100. For example, a server computer 135 may implement a machine learning algorithm to analyze historical data associated with one or more of a route schedule, a route, a vehicle, a driver, or an exception to the route schedule. The server computer 135 may then identify a resolution to the exception to the route schedule based on the analysis of the historical data. The server computer 135 may be implemented as one or more actual devices, but is collectively referred to herein as a server computer 135. The server computer 135 may include one or more processors and one or more memory (e.g., one or more non-transitory computer-readable medium) storing instructions that, when executed by the one or more processors, may cause the one or more processors to perform the operations described herein. In some embodiments, the server computer 135 may provide web-based access to the vehicle routing system 100 (or relevant portions of the vehicle routing system 100) based on which device 110, 115, 120, 125, 130, 135, 140, 145 is associated with a particular function—e.g., a parent using a user device 115 may not have permissions to assign a vehicle to service a route, while an administrator using an administrator device 125 may have permission to assign vehicles to service routes. The server computer 135 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and/or any other computing device that may be suitable to execute optimized routing and communication for a web-based vehicle routing system 100. The server computer 135 may include software and hardware modules, sequences of instructions, routines, data structures, display interfaces, and other types of structures that execute server computer 135 operations. Further, hardware components of the server computer 135 may include a combination of Central Processing Units ("CPUs"), buses, volatile and non-volatile memory devices, storage units, non-transitory computer-readable medium/storage media, data processors, processing devices, processors, control devices transmitters, receivers, antennas, transceivers, input devices, output devices, network interface devices, and other types of components that are apparent to those skilled in the art. These hardware components within the server computer 135 may be used to execute the various methods or algorithms, disclosed herein.

In some embodiments, the server computer 135 may interface with one or more devices 110, 115, 120, 125, 130, 140, 145 via the communications network 105, such as the Internet. The communications network 105 may be communicatively coupled to the server computer 135 as well as the one or more devices 110, 115, 120, 125, 130, 140, 145 to facilitates the access, storing, and/or exchange of information. The communications network 105 may be a wired, wireless, or both and may include one or more of any suitable communications path, such as a mobile network, a cable or fiber optics network, a WAN or LAN network, the Internet, or any other suitable means to facilitate communications in the vehicle routing system 100. Examples of these various internet connections include implementations using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16c, or 802.16m using any network type including a wide-area network ("WAN"), a local-area network ("LAN"), a 2G network, a 3G network, a 4G network, a 5G network and its successors, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between the devices 110, 115, 120, 125, 130, 140, 145 and server computer 135.

The vehicle routing system 100 may be implemented between a driver device 120, a provider device 130, a dispatch control center device 140, a vehicle device 145, and a ride requester device 110, such as a school device, an administrator device 125, and/or a user device 115. The various devices 110, 115, 120, 125, 130, 140, 145 described herein may be implemented by any suitable electronic device with processing power sufficient to share electronic information back and forth between devices 110, 115, 120, 125, 130, 140, 145 and/or via the communications network 105. Example devices 110, 115, 120, 125, 130, 140, 145 include mobile phones, desktop computers, laptop computers, tablets, game consoles, personal computers, mobile devices, notebook computers, smart watches, and any other digital device that has suitable processing ability to interact with the server computer 135. The one or more device 110, 115, 120, 125, 130, 140, 145 may include software and hardware modules that execute computer operations and communicate via the communication networks 105 with the server computer 135. Further, hardware components of the one or more device 110, 115, 120, 125, 130, 140, 145 may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within one or more devices 110, 115, 120, 125, 130, 140, 145 may be used to connect with the server computer 135.

In an embodiment, the driver device 120 and/or vehicle device 145 may be implemented in the vehicle routing system 100. For example, the driver device may be configured to communicate with the vehicle device 145. The driver device 120 and/or vehicle device 145 may be associated with a particular user or a particular vehicle. For example, a driver device 120 may be associated with a bus driver, while the vehicle device 145 may be associated with a bus. The driver device 120 and/or the vehicle device 145 may be implemented as an OBD (on board diagnostics) device, a camera with telematics features, and/or a RFID (radio frequency identification) tag. For example, the vehicle device 145 may be a device which couples to a bus via an OBD II port. In some embodiments, the vehicle device 145 may be configured to communicate directly with the driver device 120 or via the communications network 105, to further communicate with any other device shown in FIG. 1, including the server computer 135 and dispatch control center device 140 by a wired or wireless connection 150 using any known wireless communication protocol known in the art to provide a GPS or other location of a vehicle, for example. In an embodiment, the driver device 120 and/or the vehicle device 145 may be configured to interface with information associated with the vehicle, such as the vehicle's engine, operating systems, location, the route schedule(s) associated with the vehicle, the route(s) associated with the vehicle, the driver, exception(s) made to route schedule(s), resolution(s) to exception(s), etc. For example, a driver device 120 may be coupled to a bus via an OBD II port and may collect, store, and/or transmit information associated to the coupled bus. The data collected via the driver device 120 and/or the vehicle device 145 may be collected during the performance of servicing a route and may be transmitted to a server computer 135.

The ride requester device 110 may be implemented to select, schedule, and/or update routing. For example, a ride requester device 110 may be used to select one or more vehicles to service one or more routes via a Graphical User Interface (GUI). In an embodiment, the ride requester device 110 may be a user device 115, a school and/or administrator device 125, or other suitable device capable of receiving input of and transmitting a route service requests. Input received by the ride requester device 110 may be associated with the generation and transmission of a route service requests for providing a ride service for a route in accordance with a route schedule by one or more vehicles. For example, a parent of a student may use a user device 115 to request a ride service for their child, such as a bus pick up and/or drop off. Moreover, the ride requester device 110 may receive updated information (e.g., route navigation data including resolution(s) to a detected exception to a route schedule) related to a route, request, vehicle, user, etc. For example, the administrator device 125 may receive updated information associated with a requested ride service, such as a resolution to an exception to a route schedule, the status of the service, information concerning the vehicle performing the service, route schedules, etc. This updated information may then be presented to a user of the ride requester device 110 via the GUI.

In an embodiment, the one or more devices 110, 115, 120, 125, 130, 140, 145 may be provided with varying levels of authorization to access the vehicle routing system 100 by use of the server computer 135 and/or the provider device 130. For example, a school district may use one or more administrator devices 125 authorized to select, schedule, and/or update information associated with buses picking up and delivering children to a school. Alternatively, a user device 115 may only be authorized to select, schedule, and/or update information associated with one bus picking up and delivering one child associated with the user device 115. By providing the devices 110, 115, 120, 125, 130, 140, 145 with varying levels of authorization, various types of users with various levels of administration authorization may access and implement the vehicle routing system 100 according to their particular needs. For example, a provider device 130 may give a ride requester device 110 or an administrator device 125 access to the vehicle routing system 100 via the server computer 135 to create bus routing for a particular school district, school, bus, and/or user as appropriate.

In an embodiment, the one or more devices 110, 115, 120, 125, 130, 140, 145 may be implemented as separate devices where individual users are associated with individual devices 110, 115, 120, 125, 130, 140, 145. For example, the user device 115 may be implemented as separate devices where a first user device 115 is associated with the child rider and a second user device 115 is associated with a parent, guardian, or other supervisor of a child. In this instance, routing information relating to the picking up of the child may be sent to both the first user device 115 associated with the child and the second user device 115 associated with the parent, guardian, or other supervisor of the child. In another example, the server computer 135 may transmit individual rout information associated with a route and corresponding route schedule to a bus driver via the driver device 120 of the vehicle routing system 100. For instance, the driver device 120 may receive individual route information including an optimally selected route and corresponding route schedule from the server computer 135 for picking up a ride requester, such as a child, based on location information associated with the ride requester, such as a home or a school address and/or prior pickup/drop off history locations for children on a particular route. The individual route information may include a mandatory bus route for the driver to follow with a stop sequence at particular stop locations that are identified along the individual route. The individual route information may also include turn-by-turn navigation instructions with expected drive time duration, arrival times at stop locations, departure times from stop locations, and distances between stop locations, based on historical rides (e.g., historical data 204).

According to various embodiments, the system may take into consideration the age of the historical data. For example, the historical data element may be weighed by (e.g., multiplied with) the weight associated with the data. This way, newer data may be prioritized and older data may be de-prioritized. For example, a driver may have preferred a first route because there is a road closure along a second route. This preference is likely to be valid for a period of time (e.g., 1-7 days) but unlikely to be valid after the period of time (e.g., road closure is unlikely to last more than a week). Accordingly, data associated with relatively large weights (e.g., recent data) may have more influence in the analysis than the data that have smaller weights (e.g., older data).

Figure 3:
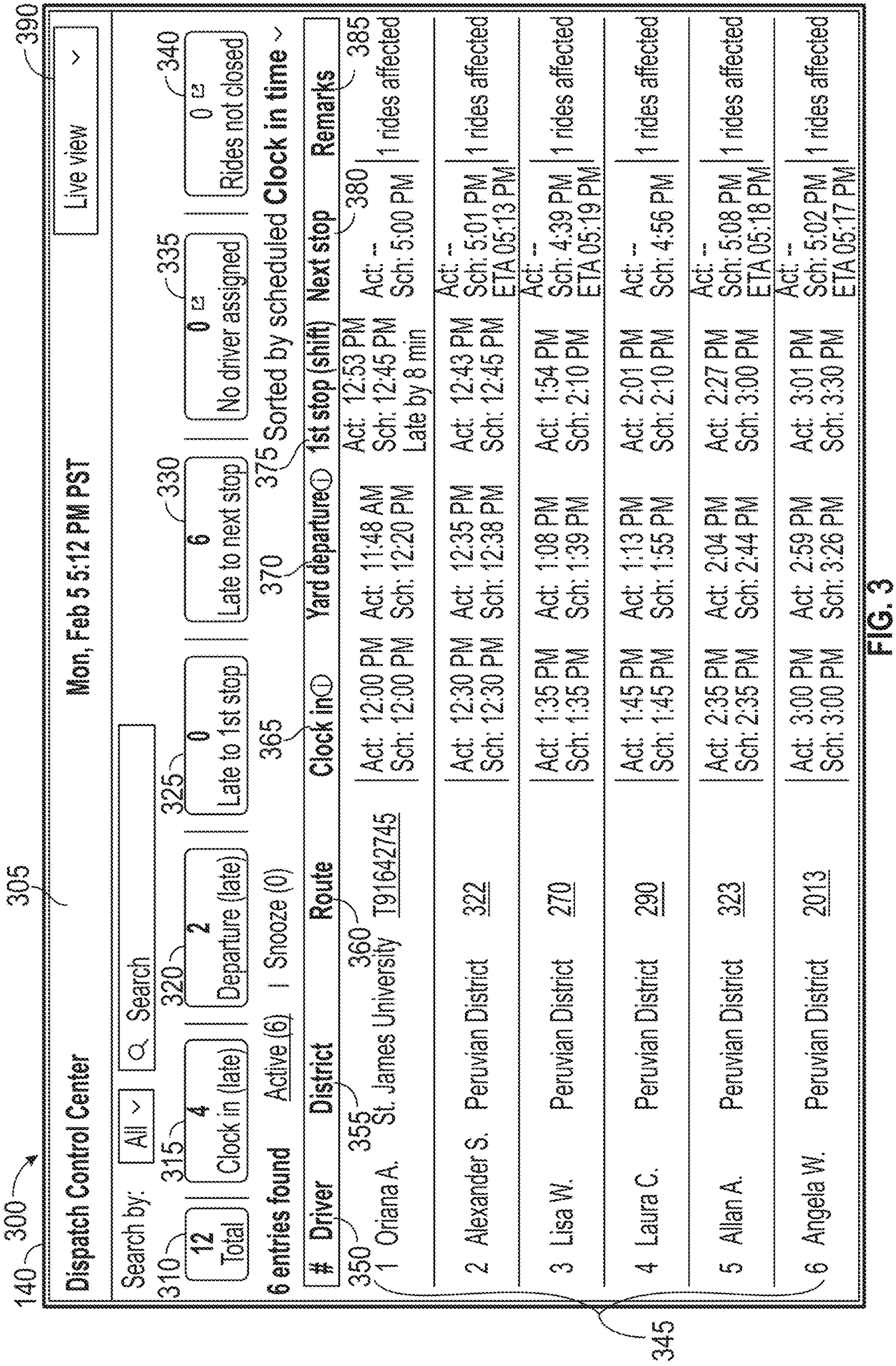
FIG. 3 illustrates an exemplary user interface for monitoring system exceptions, according to various embodiments.
Figure 4:
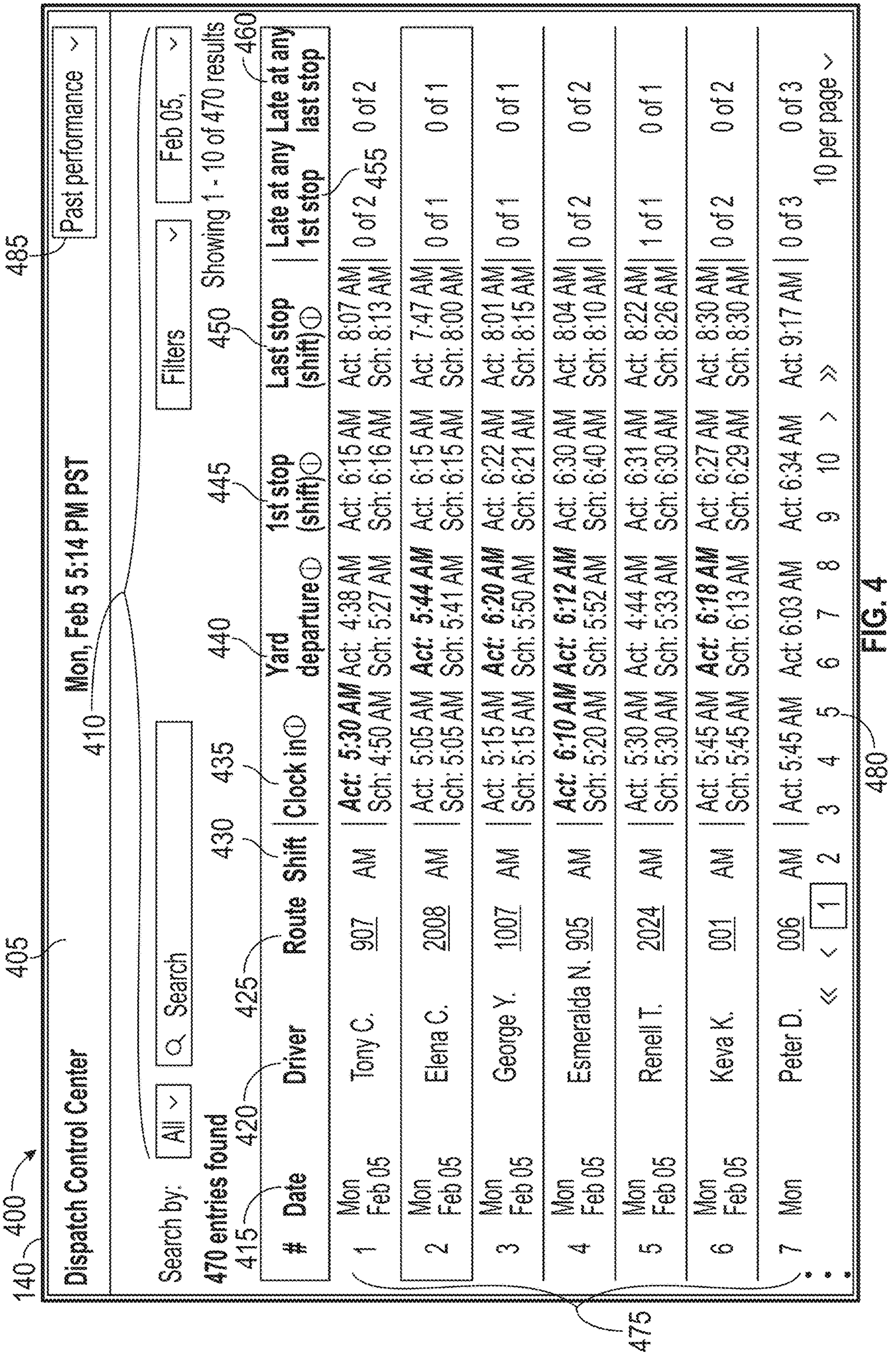
FIG. 4 illustrates another exemplary user interface for displaying system exceptions, according to various embodiments.

As discussed in further detail with respect to FIGS. 3 and 4, the server computer 135 may provide, via a GUI, a user interface for the one or more of the devices 110, 115, 120, 125, 130, 140, 145. The user interface may be utilized to create, adjust, update, and/or present information associated with routes, drivers, and/or vehicles for particular individuals. For example, route schedules corresponding not particular routes may be generated for each child in a particular school district or school as appropriate and displayed on a ride requester device 110 via the GUI. Moreover, the one or more devices 110, 115, 120, 125, 130, 140, 145 associated with a particular vehicle may be configured to display routing navigation instructions associated with the particular vehicle via the GUI. For example, a driver device 120 associated with a vehicle may be configured to display routing navigation instructions transmitted to the driver device 120 by the server computer 135.

As described herein, the components of the vehicle routing system 100 may be utilized to assign vehicles to service routes with corresponding route schedules to address ride service requests. For example, a provider device 130 may give a ride requester device 110 or an administrator device 125 access to the vehicle routing system 100 by the server computer 135 to create bus routing for a particular school district or school as appropriate. Initially, the server computer 135 may receive a request to service a route (e.g., a ride service request). For example, the server computer 135 may receive a ride service request associated with providing a ride service by a vehicle to pick up children in a particular town and to take them to a particular school. In response, the server computer 135 may determine a plurality of routes and corresponding route schedules for the received ride service requests. Specifically, the vehicle routing system 100 may determine for a particular ride service request a distance between identified stops and a travel time between each of those identified stops to determine a single bus route, a corresponding route schedule, and a number of buses required for a necessary number of routes. In an embodiment, the identified portions of a route (e.g., stop locations) may be selected based on additional criteria. For example, a stop location along a particular route may be selected based on ensuring a child, assigned to the route, does not cross a road when traveling to or from the stop location or the stop location may be selected based on the child living within a predetermine distance of the identified stop location. In some embodiments, the vehicle routing system 100 may optimize routes based on the shortest time on the road for each vehicle, based on minimal fuel usage across a fleet, based on minimal emissions across a fleet, or based on any other basis that is meaningful to the entity or community served by the fleet of vehicles. For example, if one stop location for a school bus has a large number of children assigned to board the bus, the optimized vehicle routing system 100 may determine that, since more children are boarding per the identified stop location, the particular school bus may need less time to complete an assigned route.

Once routes and corresponding route schedules are determined, the server computer 135 may assign one or more vehicles in a fleet of vehicles to service each one of the determines routes. The one or more vehicles may be assigned based on various factors. For example, a vehicle may be assigned to service a route based on the size of the vehicle being suitable for the roads along the route, the number of seats being sufficient for the assigned and/or expected number of passengers, whether or not the vehicle has passed all inspections, etc. In turn, the server computer 135 may proceed to assign each of the vehicles to a driver to perform the assigned route according to a route schedule. For example, a bus assigned to a route to pick up children for in a particular school district may be assigned to a particular bus driver to drive.

The server computer 135 may transmit information associated with the routes and route schedules to the one or more devices 110, 115, 120, 125, 130, 140, 145 associated with the vehicle routing system 100. For example, information including bus stop information for picking up a child and a time for pick up at the bus stop may be transmitted by the server computer 135 to a driver device 120 associated with the vehicle. In an embodiment, the server computer 135 may transmit the information associated with the routes and route schedules to the one or more devices 110, 115, 120, 125, 130, 140, 145 based on the user(s) associated with the device 110, 115, 120, 125, 130, 140, 145. For example, the driver device 120 may be associated with a vehicle assigned to service a particular route and, as a result, a route schedule relating to servicing the route may be transmitted to the driver device 120. As discussed in further detail below, the information associated with the routes and route schedule may include GPS information. Specifically, when a vehicle is servicing an assigned route, real time location may be provided to one or more devices 110, 115, 120, 125, 130, 140, 145. For example, when the school bus is operating, a real time location may be provided to a user device 115 so that the child and parent/guardian may identify where the bus is currently located.

Figure 2:
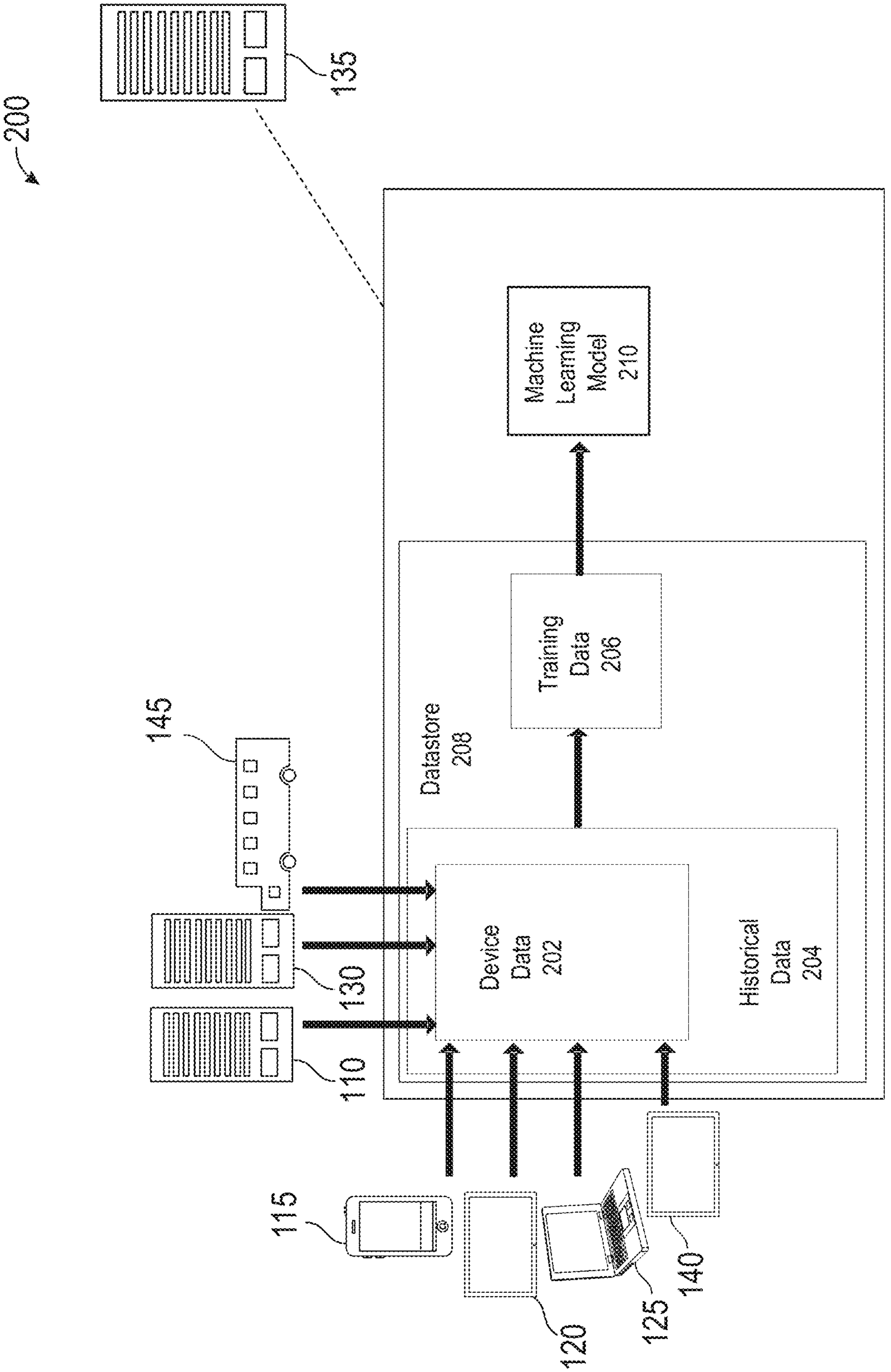
FIG. 2 illustrates a diagram of an exemplary machine learning process utilizing data to identify resolutions to exceptions to route schedules, according to various embodiments.

Based on information received from one or more devices 110, 115, 120, 125, 130, 140, 145, the server computer 135 may maintain estimated global positioning system ("GPS") stop locations and estimated time of arrival ("ETA") information for each ride. As discussed in further detail with respect to FIG. 2, the information received, including the GPS and ETA information, may be constantly and/or intermittently updated based on information provided by one or more devices 1110, 115, 120, 125, 130, 140, 145. This ETA information may be more accurate than what is currently available (e.g., may provide a more accurate arrival time as compared to an alternative arrival time generated using conventional routing techniques) because the ETA is based on updating route information and may be updated based on deviations (e.g., exceptions to a route schedule) to the route and automatically implemented resolutions in real-time as compared to conventional routing techniques which are based on the fastest route between two places (e.g., alternative arrival time). For example, the arrival time to a destination based the monitoring of vehicles, routes, and route schedules may be more accurate than an alternative arrival time determined based on stagnant route schedule information. As a result, the one or more devices 110, 115, 120, 125, 130, 140, 145 may be able to provide real-time routing, navigation, and path information based on a current location of the one or more devices 110, 115, 120, 125, 130, 140, 145. The GPS information maintained by the server computer 135 may further be used along with information received from the one or more devices 110, 115, 120, 125, 130, 140, 145 and/or the historical data 204, as shown in FIG. 2, to optimally route a fleet of vehicles. Specifically, based on the information received from the one or more devices 110, 115, 120, 125, 130, 140, 145 and/or the historical data 204, the vehicle routing system 100 may determine a distance between identified stop locations and a travel time between each of those identified stop locations to determine both a route for a single vehicle and the number of vehicles required for a plurality of routes. For example, based on a standard bus configuration, a school bus may transport 80 seated students. However, on a route with 90 students, due to space, time, and distance constraints, a certain bus may only be able to pick up 45 students at identified stop locations. Thus, a second bus may be assigned to a subset of stop locations along the route to ensure that the additional 45 students are picked up.

The server computer 135 may track a vehicle via one or more devices 110, 115, 120, 125, 130, 140, 145 during travel and ensure compliance with the optimized route (e.g., monitoring the plurality of vehicles, the plurality of routes, and the corresponding route schedules to determine if an exception to a route schedule has been made). For instance, if the one or more devices 110, 115, 120, 125, 130, 140, 145 indicates that a vehicle has made an exception (e.g., a driver failing to clock-in at a scheduled time, a vehicle departing a vehicle storage facility after the scheduled time, a vehicle arriving at a first stop on the route for the vehicle, a vehicle being late to a scheduled stop, not having a driver assigned to a vehicle, etc.), the server computer 135 may automatically send a message to the one or more devices 110, 115, 120, 125, 130, 140, 145 (e.g., a device scheduling or monitoring the route) or the server computer 135 to address the exception. For example, when an exception to a route schedule is detected, a message may automatically be sent to a device scheduling or monitoring the route to alert the user of said device that potential corrections to the route schedule may be needed. In another example, when an exception to a route schedule is detected, the server computer 135 may automatically adjust a remainder of the route schedule. The server computer 135 may update the datastore 208 based on this lack of compliance (e.g., detected exception to the route schedule) with the turn-by-turn navigation instructions to inform the machine learning model 210 of new likely routes and/or stop locations along a route for at least one particular driver. In an embodiment, based on lack of compliance with the route schedule, the server computer 135 may assign one or more alternative vehicles to service a route and/or may assign one or more stop locations to be serviced by one or more alternative vehicles.

As will be discussed in more detail with respect to FIGS. 3 and 4, routing, navigation, path information and other relevant information may be displayed on a screen associated with a device of the one or more devices 110, 115, 120, 125, 130, 140, 145 via a GUI. For example, information associated with a plurality of vehicles and a plurality of routes may be displayed on a dispatch control center device 140 via a GUI. Various users may receive, via the one or more devices 110, 115, 120, 125, 130, 140, 145, expected vehicle path information (e.g., start location, stop locations, destination stop locations, arrival and depart times associated with each stop location, etc.) from a server computer 135 and display the information via a GUI on the one or more devices 110, 115, 120, 125, 130, 140, 145. For example, a user may utilize a user interface via a GUI on the user device 115 to view a map with vehicle information associated with a particular vehicle. Thus, the user of the user device 115 may be able to track the vehicle associated with the driver device 120 in real-time and observe where the vehicle is currently and when the vehicle will be at a specific stop location. Moreover, routing information (e.g., route navigation data including stop location serviced by the bus, passengers assigned to the bus, etc.) may also be transmitted to one or more devices 110, 115, 120, 125, 130, 140, 145 based on the user(s) associated with the device 110, 115, 120, 125, 130, 140, 145. For example, a user device 115 may be associated with various users, such as a parent/guardian of a child bus rider, and, as a result, routing information relating to picking up the child bus rider may be transmitted to the user device 115.

As described herein, the components of the vehicle routing system 100 may be utilized to detect exceptions to route schedules, identify resolutions to the exceptions based on artificial intelligence analysis of historical data associated with route schedule(s), route(s), vehicle(s), driver(s), and/or detected exception(s), and automatically implement the identified resolutions. For example, information associated with a ride requester device 110 (e.g., information associated with a child that requires pick up etc.), information associated with a driver device 120 (e.g., information associated with a vehicle, a driver, etc.), and historical data (e.g., data associated with past routes taken by various vehicles and/or riders, route schedules, vehicle compliance to route schedules, etc.) may be used by the vehicle routing system 100 to identify a particular resolution to an exception to a route schedule made by a vehicle. In turn, the resolution may be automatically implemented where the resolution includes one or more of automatically sending a message to a device scheduling or monitoring the route (e.g., the user device 115, the provider device 130, an administrator device 125, a dispatch control center device 140, etc.) or automatically adjusting a remainder of the route schedule after the exception is detected. By utilizing the vehicle routing system 100 in this manner, more efficient and accurate turn-by-turn navigation may be provided to vehicles servicing routes and overall route management may be streamlined and optimized. Specifically, when a driver makes a deviation to a route schedule, the vehicle routing system 100 may quickly identify and resolve such deviations by automatically implementing resolutions to ensure drivers are provided with up-to-date navigation, while maintaining on-time route schedules. Furthermore, accurate and up-to-date trip durations can be calculated based on real time information about traffic, weather, road conditions, route deviations, etc. associated with a route and corresponding route schedule. Thus, providing users, drivers, dispatchers, and any other individuals associated with the vehicle routing system 100 real time route scheduling information. Finally, individuals (e.g., dispatchers) and/or systems 100 monitoring a fleet of vehicles may further be enabled to determine if a problem that arises is merely an issue happening that day versus an issue indicative of a bigger, more systemic problem that requires larger changes. As a result of these and other benefits, the vehicle routing system 100 presents a more streamlined and efficient system for fleet management.

FIG. 2 illustrates a diagram of an exemplary machine learning process 200 utilizing data 202, 204 to identify resolutions to exceptions to route schedules, according to various embodiments. In an example, training data 206, which may include device data 202 and historical data 204 (e.g., route schedule data, rout navigation data, vehicle data, driver data, route exception data, etc.), may be collected and/or stored in a datastore 208 accessible by the server computer 135. In turn, the training data 206 may be used to train a machine learning model 210 to analyze the data 202, 204 for the purpose of identify resolutions to route deviations (e.g., exceptions to route schedules). For example, the server computer 135 may use a model 210 based on historical data 204 to identify that a plurality of buses are trying to exit a small yard (e.g., vehicle storage facility) at the same time. Then artificial intelligence (e.g., machine learning, artificial intelligence techniques, etc.) may further be utilized to automatically apply additional time spacing between a scheduled start time of a route for the time the plurality of buses are trying to exit the small yard (e.g., vehicle storage facility). It should be noted that while the system and methods are described herein as utilizing a machine learning model 210, any suitable machine learning and/or artificial intelligence technique may be used. For example, a machine learning process implementing a neural network as opposed to an alternative machine learning algorithm may be implemented to analyze historical data 204 and identify resolutions to detected exceptions to a route schedule.

In an embodiment, the training data 206 may include historical data 204 and/or device data 202, such as data associated with a selected route, vehicle, or driver. The historical data 204 and/or device data 202 may be collected by various devices 110, 115, 120, 125, 130, 140, 145 associated with the vehicle routing system 100. For example, device data 202 related to the driving history of a particular bus or driver may be collected by the driver device 120 and transmitted to the server computer 135 for storage in a datastore 208. In an embodiment, each device 110, 115, 120, 125, 130, 140, 145 may be configured to detect particular information associated with the device 110, 115, 120, 125, 130, 140, 145 and/or the user of the device 110, 115, 120, 125, 130, 140, 145 and transmit the information as data 202, 204 to the server computer 135 via the communications network 105. For example, the driver device 120 may detect information related to a particular bus ride and transmit the information as device data 202 to the server computer 135. The real-time aggregate data 202, 204 transmitted to the server computer 135 may include information associated with one or more drivers assigned to a vehicle, vehicle information, vehicle departure and arrival times (e.g., a time the vehicle started a route), stop location information (e.g., information about actual stop times at one or more stops assigned to the route associated with the vehicle), route information and corresponding route schedules, exceptions to route schedules, distance traveled information, fuel use information, pickup duration information, speed of travel information, rider verification information, and any other information that may be used by the server computer 135 to optimize routing.

In some embodiments, the historical data 204 may be weighed (e.g., data element is multiplied with an associated coefficient indicative of the age of the data element) based on the age of the historical data 204 to prioritize newer data and de-prioritize (de-deemphasize) older data. Accordingly, data associated with relatively large weights (e.g., recent data) may have more influence in the adjustment factor than the data that have smaller weights (e.g., older data). For example, each element of the historical data 204 may be associated with a coefficient indicative of an age of the element of the historical data 204. This way, embodiments may incorporate recency of historic data in the probability calculation.

In some embodiments, the device data 202 may include data associated with a particular user of a device 110, 115, 120, 125, 130, 140, 145. For example, a user of a ride requester device 110 (e.g., a user device 115) may employ the user interface of the ride requester device 110 to create a profile. In response, data 202 associated with said user profile may be stored in non-volatile non-transitory storage media and/or may be transmitted and stored along with other device data 2020 in a datastore 208 at the server computer 135. User profiles may be created for various users of the vehicle routing system 100 and transmitted to the server computer 135 as device data 202. For example, a profile may be created for each driver and/or child in a particular school district or school. A user profile may include information such as a unique user identification, routes and route schedules associated with the user, starting, and ending locations (e.g., stop locations) associated with the user, etc.

In some embodiments, the device data 202 and/or historical data 204 may be collected and transmitted to the server computer 135 where the data 202, 204 may be stored using one or more datastores 208, such as a database, data table, or any other data storage mechanism suitable for storing data. For example, the datastore 208 may include tables relating particular users with particular vehicle routes, particular route schedules, and particular stop locations. In some embodiments, the data 202, 204 may be maintained at the datastore 208 using one or more tables. The one or more tables may include entries of data representing collected historical data 204 such as routes, particular route schedules, and the one or more vehicles historically assigned to service the routes. In an embodiment, the one or more tables in the datastore 208 may be continuously and/or intermittently updated as information is received at the server computer 135. For example, information associated with exceptions to route schedules identified in the datastore 208 may be updated as the exceptions are detected. For example, exceptions to a route schedule identified in the datastore 208 may be updated to include driver(s) failure to clock-in at scheduled time(s), vehicle(s) departing a vehicle storage facility after scheduled time(s), vehicle(s) arriving at a first stop on route(s) for the vehicle(s), vehicle(s) being late to scheduled stop(s), not having driver(s) assigned to vehicle(s), etc. As discussed below, the data 202, 204 received and stored at the server computer 135 may affect the types of resolutions identified and implemented to address exceptions made to route schedules.

In an embodiment, the training data 206 stored at the server computer 135 may be used to train a machine learning model 210 maintained at the server computer 135. Specifically, by utilizing the training data 206, the machine learning model 210 may be trained to analyze historical data 204 for use when identifying resolutions to detected exceptions to route schedules. In an embodiment, by implementing a model 210 trained with the training data 206, the server computer 135 may identify patterns that exist in the exceptions. For example, the model 210 may identify that a driver is late to clock-in every Monday or that another driver frequently clocks in at a first stop after the vehicle has left the yard (e.g., vehicle storage facility). In some embodiments, once exceptions are identified, the server computer 135 may take actions based on those patterns. For example, the model 210 may identify that a driver is frequently late to clock-in every Monday and, as a result, the server computer 135 may automatically send a message to a device (e.g., dispatch control center device 140) scheduling or monitoring the route serviced by the driver. Additionally or alternatively, the server computer 135 may identify exceptions but take no action based on patterns associated with a particular driver or a particular route based on learning from the historical data 204 about that particular route or that particular driver.

Furthermore, the machine learning model 210 may be iteratively trained used data 202, 204 continuously and/or intermittently received at the server computer 135. Thus, the data received at the server computer 135 may be used to optimize routes based on learning from past driver routes to determine a best path between stops. Route information, such as route navigation data, may be detected by or input into one or more devices 110, 115, 120, 125, 130, 140, 145 associated with the vehicle routing system 100 and transmitted to the server computer 135 as data 202, 204. For example, a driver device 120 may transmit data 202, 204 intermittently to the server computer 135. When the data 202, 204 is received, the server computer 135 may update the datastore 208 based on the data 202, 204. As a result of continuously and/or intermittently receiving updated data 202, 204, the server computer 135 may optimize based on various learned features. For example, the vehicle routing system 100 may be optimized based on learned roadblocks and driver input to the driver device 120 with new information (e.g., a street closure or construction) which causes the server computer 135 to reoptimize the bus route. Moreover, future selected routes (e.g., routes and route schedules associated with new ride service requests) and resolutions to detected exceptions generated by the server computer 135 may further be based on the updated data 202, 204. For example, a resolution to address a driver failing to clock-in at a schedule time may be optimized based on artificial intelligence analysis of the updated data 202, 204. In an embodiment, the machine learning model 210 may be iteratively trained using the updated data 202, 204 to optimize various aspects of the vehicle routing system 100. For example, the identified resolutions may be updated to optimize the enforcement of particular driving patterns, such as optimizing a route and stop locations along the route to prevent U-turns, to enforce curbside pickup to avoid children crossing streets, etc.

FIG. 3 illustrates an exemplary user interface 300 for monitoring system exceptions, according to various embodiments. For example, user interface 300 may be displayed on a screen 305 of dispatch control center device 140. The user interface 300 may provide information associated with one or more vehicles and one or more routes. For example, a dispatch control center device 140 display via the user interface 300 may display information associated with each on of a plurality of vehicles and a plurality of routes. The user interface 300 may further display information associated with exceptions experienced by vehicle routing system 100, specifically with respect to vehicle drivers using driver device(s) 120 and individual vehicles in the vehicle routing system 100. Specifically the exceptions may be identified on the dispatch control center device 140 using one or more sensory cues including visual cues (e.g., highlight, bold, color changes, etc.) and/or auditory cues (e.g., alarms, etc.). For example, the server computer 135 may generate a specific route with a corresponding route schedule for each vehicle available to the vehicle routing system 100. The route may begin at a specific location at a specific time and end at a specific location at a specific time. However, for the vehicle to arrive at the specific location delineated as the beginning of the route, the vehicle must leave a vehicle storage facility by a certain time. For the vehicle to leave the vehicle storage facility at a specific time, the vehicle must have a driver ready to drive the vehicle. As such, the driver must arrive at or before a particular time to ensure that the vehicle can leave the vehicle storage facility in time to arrive for the first stop on the assigned route. The user interface 300 of the dispatch control center device 140 will show a visual representation (e.g., visual cues) of the exceptions for every vehicle and every route assigned to be serviced on a particular day. An exception, as used herein, may be an instance where an appointed time for a specific action has not been completed by the appointed time. For example, an exception may be based on one or more of the driver failing to clock-in at a schedule time, the vehicles departing a vehicle storage facility after the scheduled time, the vehicle arriving at a first stop on the route for the vehicle, the vehicle being late to a scheduled stop, not having the driver assigned to the vehicle, etc. Further examples of exceptions will be discussed in detail below.

As shown in FIG. 3, the user interface 300 may include a number of interactive elements. The interactive elements may include a "total" interactive element 310, a "late clock-in" interactive element 315, a "late departure" interactive element 320, a "late to first stop" interactive element 325, a "late to next stop" interactive element 330, a "no driver assigned" interactive element 335, and a "rides not closed" interactive element 340.

The total interactive element 310 may display a number representative of the total number of exceptions being experienced by the vehicle routing system 100. The system 100 may monitor one or more vehicles, routes, and corresponding rout schedules and detect exceptions made by a vehicle(s) and/or driver(s) to the route schedule(s). These exceptions may be identified on a device (e.g., a dispatch control center device 140) using one or more sensory cues. For example, as shown in user interface 300, an exemplary 12 total exceptions have been detected by the server computer 135 communicated to the dispatch control center device 140, and are displayed via a visual representation associated with the total interactive element 310. A user may interact with the total interactive element 310 to obtain a list 345 of all detected exceptions within the system 100. In some embodiments, the list 345 may be filtered by interacting further with the user interface 300, as discussed in further detail below.

The clock-in late interactive element 315 may be associated with a clock-in late exception based on a driver being late to clock-in to perform a ride service. For example, as shown in the user interface 300, an exemplary 4 of the 12 total exceptions have been detected by the server computer 135 and communicated to the dispatch control center device 140. In this case the visual representation of the 4 is associated with the system 100 detecting at least 4 exceptions of drivers being late to clock-in. By interacting with the clock-in late interactive element 315 via the user interface 300, a user may filter the list 345 based on clock-in time. Once the user interacts with the clock-in late interactive element 315, the user interface 300 may alter the visual representation of the list 345 to show the exceptions related to the clock-in late interactive element 315.

The late departure interactive element 320 may be associated with a late departure exception based on a vehicle being late to leave a location (e.g., vehicle storage yard, etc.). For example, as shown in the user interface 300, an exemplary 2 of the 12 total exceptions have been detected by the server computer 135 and communicated to the dispatch control center device 140. In this case, the visual representation of the 2 is associated with the system 100 detecting at least 3 exceptions of vehicles being late to leave a location. By interacting with the late departure interactive element 320 via the user interface 300, a user may filter the list 345 based on late departures. Once the user interacts with the late departure interactive element 320, the user interface 300 may alter the visual representation of the list 345 to show the exceptions related to the late departure interactive element 320.

The late to first stop interactive element 325 may be associated with a late to first stop exception based on a vehicle being late to the first stop on an assigned route corresponding to a route schedule. For example, as shown in the user interface 300, no exceptions corresponding to a vehicle being late to a first stop along a route have been detected by the server computer 135. However, if a late to first stop exception is detected by the server computer 135, the server computer 135 may communicate the exception to dispatch control center device 140 and, in turn, the visual representation associated with the late to first stop interactive element 325 will be updated to display 1 new exception. A user may interact with the late to first stop interactive element 325 to filter the list 345 based on exceptions for each vehicle that is late to a first stop on an assigned route. Once the user interacts with the late to first stop interactive element 325, the user interface 300 may alter the visual representation of the list 345 to show the exceptions related to the late to first stop interactive element 325.

The late to next stop interactive element 330 may be associated with a late to next stop exception based on a vehicle being late to subsequent stops along an assigned route corresponding to a route schedule. For example, as shown in the user interface 300, an exemplary 6 of the 12 total exceptions have been detected by the server computer 135 and communicated to the dispatch control center device 140. In this case, the visual representation of the 6 is associated with the system 100 detecting at least 6 exceptions of vehicles being late to subsequent stops along a route. By interacting with the late to next stop interactive element 330 via the user interface 300, a user may filter the list 345 to display identifying information about each vehicle and route, for example, in which a vehicle was late to a "next" or subsequent stop after a first stop.

The no driver assigned interactive element 335 may be associated with a no driver assigned exception based on a specific route having no driver assigned to a vehicle serving the route. For example, a no driver assigned exception may be based on a driver being unable to perform the route due to sickness or personal reasons. When the server computer 135 receives information from a driver device 120 associated with a particular driver which identifies a certain driver as sick and unable to drive a vehicle on a particular route, the server computer 135 may identify an exception for that driver and the vehicle or route assigned to that driver as a no assigned driver exception. In turn, the detection of the exception may be communicated to the dispatch control center device 140 where the user interface 300 can display the identification of said exception via the no driver assigned interactive element 335.

The ride not closed interactive element 340 may be associated with a ride not closed exception based on identify a number of exceptions being experienced as a result of a driver failing to mark a specific route as completed using a device 110, 115, 120, 125, 130, 140, 145 (e.g., driver device 120). For example, the server computer 135 may detect that a final stop has been performed by a vehicle, but the ride service request has not been closed by the driver. As such, the server computer 135 may send information to the dispatch control center device 140 representative of an exception based on a driver failing to indicate that a particular route has been closed. As shown in user interface 400, no current exceptions associated with the ride not closed interactive element 340 are currently being detected within the vehicle routing system 100.

The user interface 300 may be displayed in real-time and/or near real-time to a dispatch controller associated with dispatch control center device 140. Further, exceptions shown in the user interface 300 may be addressed by one or more dispatch controllers or automatically addressed by server computer 135 (e.g., by automatically implementing a resolution to the exceptions), as will be described below. As a result of providing real-time exceptions in the user interface 300, actions to resolve the exceptions can be taken urgently when an exception is detected to prevent a cascading effect of late starting routes, late stops, late ending routes, etc.

The user interface 300 may be utilized to provide various information relevant to the vehicle routing system 100. In an embodiment, the user interface 300 may display historical data 204 associated with a selected route (e.g., a route assigned to a vehicle with a corresponding route schedule), a vehicle, and/or a driver. For instance, the historic data 204 may include driver information 350 associated with a driver of a vehicle, such as information indicating a driver's name and contact information. In another embodiment, as detailed above, the user interface 300 may provide information about each exception detected by the server computer 135. For example, the list 345 may provide driver information 350, school district information 355, route information 360 (e.g., route number), driver clock-in time 365, yard (vehicle storage facility) departure time 370, first stop time 375, next stop (e.g., subsequent stop) time 380, and remarks 385.

The school district information 355 may provide information about a school district, school, or entity that has requested the particular ride identified in the route information 360. For example, as illustrated in FIG. 3, the school district information 355 indicates that the Peruvian District has requested a ride service to service route 322, indicated in the route information 360. The route information 360 may provide information differentiating the type of ride service requested. In particular, the route information 360 may differentiate charter vehicle trips from regularly performed and scheduled ride services. For example, route T91642745 may be identified as a charter vehicle trip for an athletic event while route 322 may be a regularly performed and scheduled ride service on Monday afternoons.

The clock-in information 365, the yard (vehicle storage facility) departure information 370, and the next stop information 380 may identify an actual time that each event occurred and a scheduled time for the event to occur in list 345. The server computer 135 may provide an ETA for each of the routes, as available, with respect to the next stop information 380. In an embodiment, exceptions based on the clock-in information 365, the yard (vehicle storage facility) departure information 370, and the next stop information 380 may be identified via the user interface 300 using one or more sensory cues. The sensory cues may include visual cues (e.g., highlight, bold, color, etc.) as well as auditory cues (e.g., alarms, etc.). For example, the displayed "actual" time may be color coded on the user interface 300 to show when the "actual" time is later than the schedule time to identify the exception. In another example, as shown in the user interface 300, exceptions #1-6 on the list 345 may illustrate the late to next stop exceptions associated with the late to next stop interactive element 330. FIG. 3 illustrates only 6 of the 12 total exceptions as associated with the late to next stop interactive element 330 (e.g., late to next stop exception). The user may interact with list 345 to scroll down to see each triggered exception. The user interface 300 may indicate that the server computer 135 has identified that route T91642745 was scheduled to stop by 5:00 PM but, as of 5:12 PM, has not yet arrived and notes with respect to the first stop information 375 that the vehicle associated with route T91642745 was 8 minutes late arriving at the first stop. By using sensory cues (e.g., visual and/or audio cues), the user interface 300 can further illustrate that the vehicles associated with routes 322, 270, 290, 323, and 2013 are also late to arrive at a next stop based on applying a color coding to the actual arrival time visually representing that the actual arrival time is the exception as the actual arrival time is after the scheduled arrival time.

The user interface 300 may further provide a visualization selector 390 in which a user (e.g., the dispatch controller) utilizing a device (e.g., the dispatch control center device 140) may select to view "live" real-time exceptions or to see past exceptions. For example, a dispatch controller may interact with the visualization selector 390 to select a past view and interact with the clock-in late interactive element 315 to identify which drivers are late to clock-in over a period of time. A particular driver may be further selected from the list 345 to provide a visualization of the actual time that a driver clocked-in and a scheduled time that a driver clocked-in (e.g., indicated by a corresponding route schedule) to determine how often the driver is late. As previously discussed, exceptions, such as when the driver clocks-in after the scheduled clock-in time, may be color coded within the list 345 to visually represent each time the driver clocked-in after a scheduled clock-in time. A display of past exceptions is provided with respect to FIG. 4.

The user interface 300 may further include the remarks information 385. The remarks information 385 may identify a number of rides associated with a particular route that will be affected by an exception associated with a vehicle on a current route. For example, each route shown in the user interface 300 may have a subsequent ride service to perform which will be delayed due to the delay being experienced by each vehicle associated with each route identified in list 345 of exceptions. As a result, each ride affected by the late vehicle will be associated with "rides affected" indicated by the remarks information 385 of the user interface 300. Such a cascading effect of late rides can further delay earlier detected delays causing serious routing issues.

To address this cascading effect of late rides being further delayed by delays earlier in the day, the server computer 135 may, based on one or more rules, resolve the exceptions by taking specific action(s) (e.g., automatically implementing a resolution). In such a case, the user interface 300 may be utilized to address the exceptions to route schedules. Specifically, identified resolutions addressing exceptions may be implemented using the user interface 300. For example, a dispatch controller may interact with the dispatch control center device 140 via the user interface 300 to automatically cause a resolution to be implemented.

The server computer 135 may identify various types of resolutions to address detected exceptions. One type of resolution may be the automatic generation and sending of a text message (SMS) or a call to a device scheduling or monitoring a route (e.g., the user device 115, the driver device 120, administrator device 125, the provider device 130, the dispatch control center device 140, etc.). For example, an SMS may be sent to a driver device 120 to obtain an explanation of why an exception occurred. Another type of resolution may be the automatic adjustment of a remainder of a route schedule after the exception is detected (e.g., the remaining portion of the route after the moment in time when the exception is detected). For example, after detecting an exception associated with a vehicle arriving to a stop location late along a route, the server computer 135 may automatically adjust the remainder of the schedule associated with the route.

The server computer 135 may implement resolution(s) in accordance with various criteria. In an embodiment, upon detection of an exception, the server computer 135 may determine a score indicating an impact of the exception on a remainder of a route schedule associated with the exception. In this case, the remainder may be the remaining portion of the route associated with the route schedule after the moment in time when the exception is detected. For example, the server computer 135 may detect the exception of a bus arriving late to the second stop on a route with six stops. The corresponding remainder would be the remaining portion of the route after the exception has occurred, e.g., the four remaining stops on the route. The server computer 135 would then determine a score indicating an impact of the exception of the bus being late to the second stop on the remainder (e.g., the remaining four stops) of the route. In an embodiment, the score may be determined based on an artificial intelligence analysis of historical data 204 associated with the exception. For example, the server computer 135 may detect the exception of a driver not clocking-in for 30 minutes past the scheduled clock-in time in accordance with a route schedule. Since the historical data 204 associated with this exception shows that this delay for the particular driver or one or more other drivers does not result in a delay in the first or subsequent stops along a route, the server computer 135 will assign a low score indicating the low impact of the exception on the remainder of the route (e.g., little to no delay in the first or subsequent stops along the route). In another example, the server computer 135 may detect the exception of a driver delaying leaving the yard by 20 minutes. In this case, the historical data 204 associated with this exception may show that this type of delay for the particular driver or one or more other drivers results in a significant increase in delay in subsequent stops along the remainder of the route. In response, the server computer 135 will assign a high score indicating a large impact of the exception on the remained of the route (e.g., a large delay in subsequent stops along the route).

Based on a determined score, the server computer 135 may opt to implement or not implement various resolutions to the detected actions. In an embodiment, if the determined score is above a threshold, the identified resolution to the exception may include taking one or more corrective actions associated with a route and/or the associate route schedule. For example, if the a high score is determined with respect to the exception of no driver assigned to a route schedule, then the server computer 135 may determine and automatically implement the resolution of taking the corrective action to assign the route schedule to a driver. The corrective actions taken can be any action designed to resolve an exception. In particular, the corrective action may be updating the route schedule, eliminating a stop along a route, alerting a user located at the remaining stops, alerting a school of a late arrival, rerouting a vehicle to minimize delays, etc. In an embodiment, if the determined score is below a threshold, the identified resolution to the exception may be either to take no corrective action or to implement a less invasive resolution. For instance, when the determined score is below a threshold, the resolution to the exception may be to send a warning to a device (e.g., a user device 115, a provider device 130, an administrator device 125, a dispatch control center device 140, etc.) scheduling or monitoring a route corresponding to the exception. For example, if a delay of 5 minutes of a bus leaving the yard is determined, based on historical data 204, to have minimal impact on the remainder of the route and corresponding route schedule, then a low score may be determined. In turn, the server computer 135 may simply send a warning to a dispatch control center device 140 to indicate that the particular vehicle is delayed by 5 minutes in leaving the yard, which will not have a significant impact on the execution of the route schedule. In an embodiment, if the determined score is equivalent or approximately equivalent to the threshold, then the identified resolution to the exception may be to either take one or more corrective actions, such as when the score exceeds the threshold, or send a warning or not take any action, such as when the score falls below the threshold.

In an embodiment, a resolution may be automatically implemented based on a time threshold for performing a corresponding ride service request according to a route schedule. In such case, the server computer 135 may detect an exception and cause the dispatch control center device 140 to display the exception in the list 345 with an indication that the ride service is within acceptable tolerances due to the nature of the exception. For example, a driver being late to clock-in causing a clock-in exception may not be urgent within a 5 minute threshold of a scheduled clock-in time. But, after the 5 minute threshold lapses without clocking-in, the server computer 135 may automatically cause the resulting exception to be elevated for immediate resolution. In another example, a yard (vehicle storage facility) departure time may be 1 minute late. Based on the number of vehicles leaving the vehicle storage facility, the server computer 135 may detect the exception but not identify it as an issue unless the late departure of the vehicle is likely to cause a traffic delay at the vehicle storage facility, which may be determined to likely occur after exceeding a 10 minute threshold for a late departure time.

FIG. 4 illustrates another exemplary user interface 400 for monitoring system exceptions, according to various embodiments. The user interface 400 may be provided on the screen 405 of a device (e.g., a dispatch control center device 140). In an embodiment, the user interface 400 may be configured to display data (e.g., historical data 204) associated with a selected route, vehicle, and/or driver. For instance, as illustrated by the user interface 400, a user may interact with the visualization selector 485 to select past performance for reviewing a list of exceptions. The data displayed may include historical data 204, such as illustrated in FIG. 4, and/or may include analysis thereof. For example, the user interface 400 may display graphs and analysis reports for a selected route that indicate that overall a 10 minute delay in yard departure does not result in significant delays at a first stop, at subsequent stops, or at time of arrival. The data may further include various information associated with each displayed exception including date information 415, driver information 420, route information 425, shift information 430, clock-in information 435, yard (vehicle storage facility) departure information 440, first stop time information 445, last stop time information 450, late at any first stop information 455, and late at any last stop information 460. Utilizing the user interface 400, a user, such as a dispatch controller, may be provided with tools 410 to filter, search, and sort the displayed data. In particular, a user can filter, search, and sort data representative of exceptions that occurred on a selectable day or date. For example, a user may input a filter to display exceptions that occurred on February 5th as of 5:14 PM and, as a result, the user interface 400 may identify 470 exceptions. The user interface 400 may further enable a user to select various pages 480 of exceptions to be shown in the list 475, as desired.

The date information 415 may include date information associated with vehicles, routes, route schedules, etc. As shown in the user interface 400, exceptions may be selected with tools 410 to be displayed by date, February 5, and, as a result, the dates shown in the date information 415 all correspond to the same date, February 5. However, in the event that a month is selected with the tools 410, the dates shown in the date information 415 may be different. The driver information 420 may include information about a driver associated with a particular route, vehicle, route schedule, etc. For example, the driver information 420 may include a name of the driver, the contact information for the driver, an address for the driver, or any other information contained within vehicle routing system 100 about the particular driver. The route information 425 may include information about an assigned route. In particular, the route information 425 may include information indicating whether the route was assigned as a charter service route or a regularly scheduled and performed route. The shift information 430 may identify information related to route schedule(s) associated with a driver. For example, the shift information 430 may identify a driver shift such as an AM shift (e.g., a morning shift) or a PM shift (e.g., an afternoon/evening shift). The clock-in information 435 may identify information associated with a driver clocking-in for a route schedule. In an embodiment, the clock-in information 435 may include either or both an actual clock-in time for a driver and the scheduled clock-in time for a driver. The clock-in information 435 may further be displayed with sensory cues, such as visual and/or audio cues. For instance, exceptions caused by clock-in times may be color coded to identify the cause of the exception, which will be discussed in further detail below. The yard departure information 440 may identify information associated with a vehicle departing a location. In an embodiment, the yard departure information 440 may include either or both an actual time for departing a vehicle storage facility and a scheduled time for departing a vehicle storage facility. The scheduled time for departing a vehicle storage facility may be assigned by the server computer 135 to route a vehicle to a first stop location to arrive by an assigned pick-up time for a first stop along an assigned route. The yard departure information 440 may further be displayed with sensory cues, such as visual and/or audio cues. For instance, exceptions related to the yard departure information 440 may be color coded in the user interface 400 for identification of the exception.

The first stop information 445 may identify information associated with the time a vehicle arrives at a first stop. In an embodiment, the first stop information 445 may include either or both an actual time for a first stop along a route and a scheduled time (e.g., as indicated in the route schedule) for a first stop along a route as assigned during route optimization. The first stop information 445 may further be displayed with sensory cues, such as visual and/or audio cues. For instances, exceptions related to the first stop information 445 may be color coded in the user interface 400 for identification of the exception. The last stop information 450 may identify information associated with the time a vehicle arrives at a last stop. In an embodiment, the last stop information 450 may include either or both an actual time for a last stop along a route and a scheduled time (e.g., as indicated in the route schedule) for a last stop along a route as assigned during route optimization. The last stop information 450 may further be displayed with sensory cues, such as visual and/or audio cues. For instance, exceptions related to the last stop information 450 may be color coded in the user interface 400 for identification of the exception.

The late at any first stop information 455 may identify information associated with the number of first stops for which the vehicle was late. The late at any first stop information 455 may be rated as X out of Y, where X is the number of late first stops and Y is the total number of first stops. The late at any last stop information 460 may identify information associated with the number of last stops for which the vehicle was late. The late at any last stop information 460 may be rated as X out of Y, where X is the number of late last stops and Y is the total number of last stops. The late at any first stop information 455 and the late at any last stop information 460 may be useful to assess driver performance over a series of routes or rides within a route each having a first stop and a last stop associated with the route on the particular day. For example, a route may consist of a first stop at a high school and a last stop at the home of the last high school student on the bus, followed by a first stop at an elementary school and a last stop at a home of the last elementary school student on the bus. In this manner, a driver's performance of a route (e.g., multiple rides) may be assessed using the late at any first stop information 455 and the late at any last stop information 460.

As depicted in user interface 400, exceptions identified as 1-7 are shown in the list 475. In the example, the first exception detected of the day occurred on route 907 where the server computer 135 determined that the driver, Tony C. clocked in at 5:30 AM and was scheduled to clock-in at 4:50 AM. However, the server computer 135 further determined that a vehicle assigned to route 907 departed the yard (vehicle storage facility) at 4:38 AM. Based on an artificial intelligence analysis of the data, a resolution to the identified first exception can be identified. Specifically, based on the departure of the vehicle assigned to route 907 at 4:38 AM, the server computer 135 may determine that Tony C. did not properly clock-in. As a result, the server computer 135 may identify a resolution to the clock-in exception. In the present case, the resolution may be to automatically send a message to Tony C. via driver device 120, to remind him to clock-in, which he did at 5:30 AM, just after his scheduled yard (vehicle storage facility) departure at 5:27 AM.

Conversely, the server computer 135 further detected an exception with respect to route 905 as the driver, Esmerelda N. clocked in 50 minutes late at 6:10 AM, and departed the yard (vehicle storage facility) at 6:12 AM, 30 minutes late. The server computer 135, based on an analysis of the data (e.g., an artificial intelligence analysis of the historical data 204), can determine that the driver, in this case, is late to clock-in for work at 5:20. However, based on a time threshold for performing the ride service request according to the route schedule, the server computer 135 may determine not to implement a resolution (besides noting the exception). Specifically, since the 1st stop for the route schedule is not scheduled to occurring until 6:40 AM, the server computer 135 may determine that a time threshold for performing the ride service has not been exceeded and thus no resolution is needed. In other words, the server computer 135 determines at 5:20 AM that the driver is late but not so late as to begin a cascade effect of late routes through the day. Specifically, the server computer 135 may determine that traveling from the yard (vehicle storage facility) to the first stop may only take 18 minutes, which means that the driver may still arrive at the first stop location at the time designated by the route schedule. As such, the server computer 135 opts to take no action to resolve the problem created by the lateness of the driver because as long as the vehicle departs the yard (vehicle storage facility) by 6:22 AM, the route will not be delayed. When the server computer 135 determines that the vehicle associated with route 905 departs the yard (vehicle storage facility) at 6:12 AM, the server computer 135 determines that no additional action is necessary as the vehicle will arrive to the first stop at or before the scheduled time (e.g., according to the corresponding route schedule). In this example, had the driver not clocked in with enough time to arrive at the first stop as scheduled, the server computer 135 may identify a resolution to address the exception, such as identifying a substitute driver who is "on call" and automatically sending a message to a driver device 120 associated with the "on-call" driver instructing the driver to perform route 905. The "on-call" driver may be at the vehicle storage facility and ready to substitute for Esmerelda N. in the event that Esmerelda N. arrives too late to drive the vehicle to the first stop location by the assigned start time.

In another example, route 2008 is shown in the user interface 400 as identifying an exception for a late departure from the yard (vehicle storage facility). Specifically, the server computer 135 may identify the exception associated with the vehicle associated with route 2008 leaving the yard (vehicle storage facility) at 5:44 AM, a delay of 3 minutes over the scheduled departure time of 5:41. The server computer 135 may determine that based on analysis of other data (e.g., an artificial intelligence analysis of historical data 204) that the delayed departure was a systemic issue as several buses had exceptions at a similar time at the same yard (vehicle storage facility). In response, the server computer 135 may identify a resolution based on the analysis of the data. Specifically, the server computer 135 may determine that additional time is needed to prevent traffic inside the yard (vehicle storage facility) from becoming congested between 5:35 and 5:45 AM. As a result, the server computer 135 may identify that the resolution is to adjust yard departure times for various routes. Thus the server computer may automatically implement the resolution and assign at least a new yard departure time for route 2008 (and other routes that were similarly affected) to give each vehicle an additional duration of time to depart the yard (vehicle storage facility). In other words, approximately half of the buses affected by the exception are instructed to depart the yard (vehicle storage facility) earlier while the other half are instructed to depart the yard (vehicle storage facility) later, each route being separated by 1 minute increments (for example) from 5:35 AM to 5:45 AM.

In another example, route 1007 is shown in user interface 400 as identifying an exception for a late yard (vehicle storage facility) departure at 6:20 AM when the scheduled departure was for 5:50 AM. The server computer 135 may identify the exception that a vehicle associated with route 1007 is delayed at 5:50 AM and automatically implement a resolution by sending a message to the dispatch control center device 140 to inform a dispatch controller that the driver for the vehicle associated with route 1007 has clocked-in but is late leaving. In such a case, the dispatch controller may mute the exception for any reason, such as muting the exception based on a vehicle malfunction. In response, the server computer 135 may implement another resolution by sending a message to the dispatch control center device 140 to query the dispatch controller about providing another unassigned vehicle to the route to prevent the route from being late (e.g., address the detected exception). Based on the dispatch controller's understanding of the situation, the dispatch controller may reply to the server computer 135 with a message that indicates no reassignment is needed (e.g., no resolution need be implemented). At this point, the server computer 135 proceeds to detect that the vehicle associated with route 1007 departs the yard at 6:20 AM and is subsequently late to a first stop at 6:22. Since the dispatch controller had already indicated that no resolution is needed to address the exception the server computer 135 will identify the vehicle as being late to a first stop in the exception and make a record of the exception without proceeding to implement further resolutions.

In another example, route 001 is scheduled to depart the yard (vehicle storage facility) at 6:13 AM. However, the server computer 135 detects the exception that the vehicle assigned to route 001 is delayed by 5 minutes at 6:18 AM even though the driver has clocked-in. Based on an analysis of data (e.g., an artificial intelligence analysis of historical data 204), the server computer 135 determines that a 5 minute delay at the yard (vehicle storage facility) is a time threshold limit for performing the route as scheduled. Thus, when the time threshold of 5 minutes is exceeded at 6:18 AM, the server computer 135 may automatically implement a resolution by sending a message to a driver device 120 associated with the driver, Keva K. that communicates that the ride is 5 minutes behind schedule and requests that the driver proceed to service the route. Keva K. may then receive the message by the driver device 120 and, as a result, realize that the vehicle is behind schedule and immediately departs the yard at 6:18 AM.

As discussed in detail with respect to FIGS. 1 and 2, the server computer 135 may use historical data 204 stored in a datastore 208 associated with the server computer 135 to identify exceptions that have occurred in the past. The historic data 204 may be aggregated and utilized to train a machine learning model 210, empowering the server computer 135 to apply machine learning to real-time situations by artificial intelligence. For example, the server computer 135 may use a model 210 based on historical data 204 to identify an exception association with a plurality of buses trying to exit a small yard (vehicle storage facility) at the same time. The server computer 135 may, in turn, identify a resolution to the exception based on an artificial intelligence analysis of the historical data 204 and automatically implement a resolution associated with applying additional time spacing between a scheduled start time of a route for the time the plurality of buses are trying to exit the small yard (vehicle storage facility). The model 210 used by the server computer 135 may identify patterns that exist in exceptions, such as a driver is late to clock-in every Monday, or that another driver frequently clocks in at a first stop after the vehicle has left the yard (vehicle storage facility). The server computer 135 may further identify exceptions but take no action based on the patterns associated with a particular driver or a particular route based on learning from historical data 204 about that particular route or that particular driver.

For example, the server computer 135 may detect an exception with respect to route 2024 because a vehicle assigned to route 2024 departs the yard (vehicle storage facility) before the driver has clocked-in. However, the server computer 135 may also identify a pattern, based on an artificial intelligence analysis of historical data 204 associated with the route schedule, route 2024, the vehicle, and/or the exception, to be aware that Renelli T. often forgets to clock-in on Monday mornings. As a result, the server computer 135 may identify a resolution to the exception based on the artificial intelligence analysis of the historical data 204 and may automatically implement the resolution by sending a message to Renelli T via the driver device 120 to remind Renelli T. to clock-in at the time Renelli T. usually arrives at the yard (vehicle storage facility).

Figure 5:
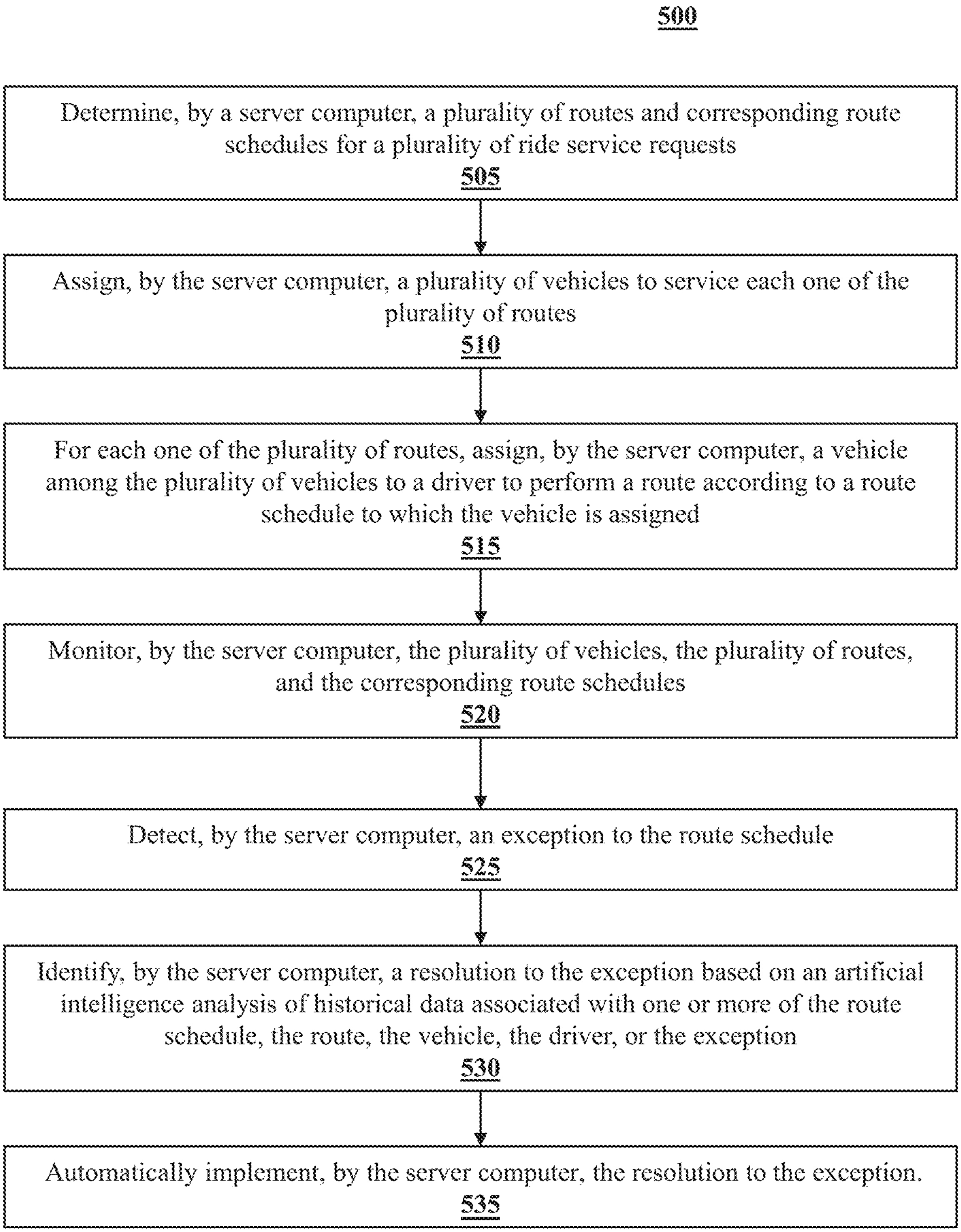
FIG. 5 illustrates an exemplary method for detecting exceptions and resolving exceptions, according to various embodiments.

FIG. 5 illustrates an exemplary method 500 for detecting exceptions and resolving exceptions, according to various embodiments. Method 500 begins at step 505 where a server computer 135 determines a plurality of routes and corresponding route schedules for a plurality of ride service requests. For example, a route and route schedule may be determined for a ride service request to pick up a child at their home and transport the child to a school. Then, at step 510, the server computer assigns a plurality of vehicles to service each one of the plurality of routes. For example, a vehicle may be assigned by the server computer 135 to each one of the plurality of ride service requests. At step 515, for each one of the plurality of routes, the server computer 135 assigns a vehicle among the plurality of vehicles to a driver to perform a route according to a route schedule to which the vehicle is assigned. At step 520, the server computer monitors the plurality of vehicles, the plurality of routes, and the corresponding route schedules. Then, at step 530, the server computer 135 detects an exception to the route schedule. The detected exception may be based on various deviations to a route schedule, such as a driver failing to clock-in at a scheduled time, a vehicle departing a vehicle storage facility after the scheduled time, a vehicle arriving at a first stop on the route for the vehicle, a vehicle being late to a scheduled stop, not having the driver assigned to the vehicle, etc. At step 530, the server computer 135 identifies a resolution to the exception based on an artificial intelligence analysis of historical data 204 associated with one or more of the route schedule, the route, the vehicle, the driver, or the exception. Finally, at step 535, the server computer 135 automatically implements the resolution to the exception.

For example, as discussed above, the server computer 135 may detect an exception to the route schedule where the exception is a time delay based on a driver failing to clock-in appropriately or a vehicle departing a yard (vehicle storage facility) late. In turn, the server computer 135 may apply machine learning (e.g., a machine learning model 210) and/or artificial intelligence analysis to historical data 204. Specifically, the historic data 204 may be aggregated and utilized to train a machine learning model 210, empowering the server computer 135 to identify the time delay exception. The server computer 135 may, in turn, identify a resolution to the exception based on the artificial intelligence analysis of the historical data 204 and automatically implement the resolution to the exception, which may include altering scheduled times, sending a message, notifying a dispatch control center device 140 that an issue exists, or other resolutions. The server computer 135 may implement the machine learning model 210 to identify patterns that exist in exceptions and implement resolutions based on those patterns. For example, the server computer 135 may send a message to a dispatch control center device 140 identifying a particular driver as being late to clock-in for 25% of shifts on time and send a message to a driver device 120 to remind the driver to clock-in as scheduled. The server computer 135 may further identify exceptions but take no action based on the patterns associated with a particular driver or a particular route based on learning from historical data 204 about that particular route or that particular driver. Moreover, the server computer 135 may optionally require human and/or automated approval before sending a message or a proposed resolution to an identified exception.

By using the techniques described herein to monitor and detect exceptions to route schedules and automatically implement resolutions, the system 100 is capable of providing flexible and extensible detection capabilities to ensure that vehicle routes and ride requests are serviced according to a prescribed schedule. Moreover, the aggregation of relevant fleet information further enables users, such as dispatchers using dispatch control center devices 140, to easily track fleets of vehicles and associated driver information while also quickly identifying and resolving deviations being made by the vehicles and/or drivers. As a result, a user can proactively identify and solve problems as they are presented reducing overall manual effort and manual mistakes. The system 100 herein further allows users to identify if issues are minor one-off incidents versus incidents indicative of larger, more systemic problems that require bigger changes. Specifically, trends can be analyzed at the individual driver and/or at the yard (vehicle storage facility) level to determine a cause of a delay. Based on the analyzed trends, actions can be taken to resolve the delay in a proactive manner, which further reduces mistakes and delays and streamlines daily operations. Such techniques enable users to not only address problems as they arise, but flags delays before they event happen, providing further efficient and streamlined vehicle routing.

The foregoing description has been presented for the purposes of illustration and description. It is not intended to be exhaustive or to limit the disclosure to the precise form disclosed. Many modifications and variations are possible in light of the above disclosure and teachings. Further, it should be noted that any or all of the aforementioned alternate implementations may be used in any combination desired to form additional hybrid implementations of the disclosure. For example, components described herein may be removed and other components added without departing from the scope or spirit of the embodiments disclosed herein or the appended claims.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system, comprising:

a server computer comprising one or more processors and a memory storing instructions that, when executed by the one or more processors, cause the one or more processors to:

determine a plurality of routes and corresponding route schedules for a plurality of ride service requests;

assign a plurality of vehicles to service each one of the plurality of routes;

for each one of the plurality of routes, assign a vehicle among the plurality of vehicles to a driver to perform a route according to a route schedule to which the vehicle is assigned;

monitor the plurality of vehicles, the plurality of routes and the corresponding route schedules;

maintain estimated global positioning system ("GPS") information and estimated time of arrival ("ETA") information for each vehicle servicing each one of the plurality of routes;

receive real-time information from vehicle devices, wherein a vehicle device is associated with each one of the plurality of vehicles;

continuously update the estimated GPS information and the estimated ETA information based on the real-time information received from the vehicle devices;

train an artificial intelligence engine associated with the server computer using historical data associated with one or more of the route schedule, the route, the vehicle, the driver, and past exceptions;

detect, using the trained artificial intelligence engine, an exception having a potential to impact the route schedule before the exception causes in a delay;

analyze, using the trained artificial intelligence engine, the historical data associated with one or more of the route schedule, the route, the vehicle, the driver, and the exception as well as the estimated GPS information, the estimated ETA information and the real-time information received from the plurality of vehicles;

identify, using the trained artificial intelligence engine, a resolution to the exception based on analysis of the historical data, wherein the resolution reduces or eliminates the potential to impact the route schedule; and proactively reducing or eliminating the potential to impact the route schedule by automatically implementing the resolution to the exception, wherein the resolution includes:

automatically sending a message to a device scheduling or monitoring the route, and automatically adjusting a remainder of the route schedule after the exception is detected when it is determined that the remainder of the route will be impacted by the exception.

2. The system of claim 1, wherein the exception is based on one or more of the driver failing to clock in at a scheduled time, the vehicle departing a vehicle storage facility after the scheduled time, the vehicle arriving at a first stop on the route for the vehicle, the vehicle being late to a scheduled stop, or not having the driver assigned to the vehicle.

3. The system of claim 1, wherein the instructions, when executed by the one or processors, cause the one or more processors to:

determine, using the trained artificial intelligence engine, a score indicating an impact of the exception on a remainder of the route schedule based on the analysis of the historical data, wherein the resolution to the exception includes taking a corrective action associated with the route or the route schedule if the score is above a threshold, and wherein the resolution to the exception includes sending a warning to a device scheduling or monitoring the route when the score is below the threshold.

4. The system of claim 1, wherein the instructions, when executed by the one or processors, cause the one or more processors to:

display information associated with each one of the plurality of vehicles and the plurality of routes on a dispatch control center device; and identify the exception on the dispatch control center device using one or more sensory cues.

5. The system of claim 4, wherein the dispatch control center device is configured to display historic data associated with a selected route, vehicle, or driver.

6. The system of claim 4, wherein the information associated with each one of the plurality of vehicles includes real-time aggregate data including information associated with one or more of a driver assigned to the vehicle, a time the vehicle started the route, a scheduled and actual stop time at one or more stops assigned to the route associated with the vehicle.

7. The system of claim 4, further comprising the dispatch control center device.

8. The system of claim 1, wherein automatically implementing the resolution is based on a time threshold for performing a ride service request according to the route schedule.

9. The system of claim 1, wherein an element of the historical data associated with one or more of the route schedule, the route, the vehicle, the driver, or the exception is associated with a coefficient indicative of an age of the element of the historical data, wherein the element of the historical data is weighed using the coefficient.

10. A method, comprising:

determining, by a server computer, a plurality of routes and corresponding route schedules for a plurality of ride service requests;

assigning, by the server computer, a plurality of vehicles to service each one of the plurality of routes;

for each one of the plurality of routes, assigning, by the server computer, a vehicle among the plurality of vehicles to a driver to perform a route according to a route schedule to which the vehicle is assigned;

monitoring, by the server computer, the plurality of vehicles, the plurality of routes and the corresponding route schedules;

maintaining, by the server computer, estimated global positioning system ("GPS") information and estimated time of arrival ("ETA") information for each vehicle servicing each one of the plurality of routes;

receiving, by the server computer, real-time information from vehicle devices, wherein a vehicle device is associated with each one of the plurality of vehicles;

continuously updating, by the server computer, the estimated GPS information and the estimated ETA information based on the real-time information received from the vehicle devices;

training an artificial intelligence engine associated with the server computer using historical data associated with one or more of the route schedule, the route, the vehicle, the driver, and past exceptions;

detecting, using the trained artificial intelligence engine, an exception having a potential to impact the route schedule before the exception causes in a delay;

analyzing, using the trained artificial intelligence engine, the historical data associated with one or more of the route schedule, the route, the vehicle, the driver, and the exception as well as the estimated GPS information, the estimated ETA information and the real-time information received from the plurality of vehicles;

identifying, using the trained artificial intelligence engine, a resolution to the exception based on analysis of the historical data, wherein the resolution reduces or eliminates the potential to impact the route schedule; and proactively reducing or eliminating the potential to impact the route schedule by automatically implementing the resolution to the exception, wherein the resolution includes:

automatically sending a message to a device scheduling or monitoring the route, and automatically adjusting a remainder of the route schedule after the exception is detected when it is determined that the remainder of the route will be impacted by the exception.

11. The method of claim 10, wherein the exception is based on one or more of the driver failing to clock in at a scheduled time, the vehicle departing a vehicle storage facility after the scheduled time, the vehicle arriving at a first stop on the route for the vehicle, the vehicle being late to a scheduled stop, or not having the driver assigned to the vehicle.

12. The method of claim 10, further comprising:

determining, by the server computer using the trained artificial intelligence engine, a score indicating an impact of the exception on a remainder of the route schedule based on the analysis of the historical data, wherein the resolution to the exception includes taking a corrective action associated with the route or the route schedule if the score is above a threshold, and wherein the resolution to the exception includes sending a warning to a device scheduling or monitoring the route when the score is below the threshold.

13. The method of claim 10, further comprising:

displaying, by the server computer, information associated with each one of the plurality of vehicles and the plurality of routes on a dispatch control center device; and identifying, by the server computer, the exception on the dispatch control center device using one or more sensory cues.

14. The method of claim 13, wherein the dispatch control center device is configured to display historic data associated with a selected route, vehicle, or driver.

15. The method of claim 13, wherein the information associated with each one of the plurality of vehicles includes real-time aggregate data including information associated with one or more of a driver assigned to the vehicle, a time the vehicle started the route, a scheduled and actual stop time at one or more stops assigned to the route associated with the vehicle.

16. The method of claim 10, wherein the resolution includes one or more of automatically sending a message to a device scheduling or monitoring the route, or automatically adjusting a remainder of the route schedule after the exception is detected.

17. A non-transitory computer-readable medium storing instructions that, when executed on a server computer, cause the server computer to perform steps comprising:

determining a plurality of routes and corresponding route schedules for a plurality of ride service requests;

assigning a plurality of vehicles to service each one of the plurality of routes;

for each one of the plurality of routes, assigning a vehicle among the plurality of vehicles to a driver to perform a route according to a route schedule to which the vehicle is assigned;

monitoring the plurality of vehicles, the plurality of routes and the corresponding route schedules;

maintaining, by the server computer, estimated global positioning system ("GPS") information and estimated time of arrival ("ETA") information for each vehicle servicing each one of the plurality of routes;

receiving, by the server computer, real-time information from vehicle devices, wherein a vehicle device is associated with each one of the plurality of vehicles;

continuously updating, by the server computer, the estimated GPS information and the estimated ETA information based on the real-time information received from the vehicle devices;

training an artificial intelligence engine associated with the server computer using historical data associated with one or more of the route schedule, the route, the vehicle, the driver, and past exceptions;

detecting, using the trained artificial intelligence engine, an exception having a potential to impact the route schedule before the exception causes in a delay;

analyzing, using the trained artificial intelligence engine, the historical data associated with one or more of the route schedule, the route, the vehicle, the driver, and the exception as well as the estimated GPS information, the estimated ETA information and the real-time information received from the plurality of vehicles;

identifying, using the trained artificial intelligence engine, a resolution to the exception based on analysis of the historical data, wherein the resolution reduces or eliminates the potential to impact the route schedule; and proactively reducing or eliminating the potential to impact the route schedule by automatically implementing the resolution to the exception, wherein the resolution includes:

automatically sending a message to a device scheduling or monitoring the route, and automatically adjusting a remainder of the route schedule after the exception is detected when it is determined that the remainder of the route will be impacted by the exception.

* * * * *